(12) United States Patent
Shi et al.

(10) Patent No.: US 12,090,440 B2
(45) Date of Patent: Sep. 17, 2024

(54) FILTER ELEMENT FOR COUPLING ADSORPTION AND REGENERATION OF VOLATILE ORGANIC COMPOUNDS AND PURIFICATION DEVICE

(71) Applicant: BEIJING MUNICIPAL RESEARCH INSTITUTE OF ENVIRONMENTAL PROTECTION, Beijing (CN)

(72) Inventors: Aijun Shi, Beijing (CN); Lei Nie, Beijing (CN); Wanqing He, Beijing (CN); Tianyi Wang, Beijing (CN); Zhen Yao, Beijing (CN); Zhiping Wang, Beijing (CN)

(73) Assignee: BEIJING MUNICIPAL RESEARCH INSTITUTE OF ENVIRONMENTAL PROTECTION, Beijing (CN)

( * ) Notice: Subject to any disclaimer, the term of this patent is extended or adjusted under 35 U.S.C. 154(b) by 425 days.

(21) Appl. No.: 17/617,986

(22) PCT Filed: Jun. 17, 2021

(86) PCT No.: PCT/CN2021/100608
§ 371 (c)(1),
(2) Date: Dec. 10, 2021

(87) PCT Pub. No.: WO2022/017087
PCT Pub. Date: Jan. 27, 2022

(65) Prior Publication Data
US 2022/0305429 A1   Sep. 29, 2022

(30) Foreign Application Priority Data
Jul. 24, 2020   (CN) .................. 202010727527.X

(51) Int. Cl.
*B01D 53/04* (2006.01)
*B01D 53/86* (2006.01)

(52) U.S. Cl.
CPC ..... *B01D 53/0407* (2013.01); *B01D 53/0438* (2013.01); *B01D 53/8668* (2013.01); *B01D 2257/708* (2013.01)

(58) Field of Classification Search
CPC .......................... B01D 53/04; B01D 53/0407; B01D 53/0438; B01D 53/8668; B01D 53/885;
(Continued)

(56) References Cited

U.S. PATENT DOCUMENTS 5,961,696 A * 10/1999 Gombos ............ B01D 46/2411
55/502
6,156,211 A * 12/2000 Gonzalez-Martin ...... C01B 3/38
204/157.9
(Continued)

FOREIGN PATENT DOCUMENTS

| CN | 102580649 A | 7/2012 |
|---|---|---|
| CN | 103920362 B | 7/2014 |

(Continued)

OTHER PUBLICATIONS

Machine-generated English translation of CN 206086282 U, published Apr. 4, 2012 (Year: 2012).*
(Continued)

*Primary Examiner* — Frank M Lawrence, Jr.
(74) *Attorney, Agent, or Firm* — Bookoff McAndrews, PLLC

(57) ABSTRACT

A filter element for coupling adsorption and regeneration of volatile organic compounds and a purification device are provided. The filter element includes a filter element body, a photocatalytic mechanism and adsorption-filtration body(s). The adsorption-filtration body(s) may be of a hollow columnar structure where the photocatalytic mechanism is located. VOCs are quickly adsorbed by the adsorption-filtration body(s), then thermal desorption regeneration is performed on the adsorption-filtration body(s) during a time interval of stopping discharging of the exhaust gas, and (Continued)

a photocatalysis technology is used to cyclically purify the thermally desorbed VOCs, which achieves the synergy of high-density and purification in the two technologies. Furthermore, it takes full advantages of high adsorption, filtration and purification efficiency, low photolysis catalysis costs, and easy operation and maintenance of the on-site regeneration.

17 Claims, 8 Drawing Sheets

(58) Field of Classification Search
CPC .... B01D 2257/708; B01D 2255/20707; B01D 2255/802; B01D 2259/804
USPC .... 96/108, 121, 126, 224; 55/341.1, 341.11, 55/356; 422/24, 186.3
See application file for complete search history.

(56) References Cited

U.S. PATENT DOCUMENTS

| | | |
|---|---|---|
| 6,358,374 B1 | 3/2002 | Obee et al. |
| 6,962,660 B2* | 11/2005 | Wybo .................... C02F 1/004 |
| | | 210/489 |
| 2005/0132681 A1* | 6/2005 | Chu .................... B01D 53/0415 |
| | | 55/471 |
| 2006/0182670 A1* | 8/2006 | Allen ...................... F24F 8/192 |
| | | 422/186.3 |
| 2020/0179910 A1* | 6/2020 | Park ........................ B01J 21/063 |
| 2021/0010692 A1* | 1/2021 | Worrilow .................. F24F 8/22 |
| 2021/0270474 A1* | 9/2021 | Bruno .................. B01D 46/442 |
| 2022/0125963 A1* | 4/2022 | Choi .......................... A61L 2/22 |

FOREIGN PATENT DOCUMENTS

| | | | |
|---|---|---|---|
| CN | 104848443 A | | 8/2015 |
| CN | 206086282 U | * | 4/2017 |
| CN | 109046019 A | | 12/2018 |
| CN | 109966816 A | | 7/2019 |
| CN | 111760455 A | | 10/2020 |

OTHER PUBLICATIONS

International Search Report and Written Opinion in International Application No. PCT/CN2021/100608, mailed Sep. 15, 2021, with English translation (14 pages).

* cited by examiner

FILTER ELEMENT FOR COUPLING ADSORPTION AND REGENERATION OF VOLATILE ORGANIC COMPOUNDS AND PURIFICATION DEVICE

CROSS REFERENCE TO RELATED APPLICATIONS

This patent application is the national phase application of International Application No. PCT/CN2021/100608 filed on Jun. 17, 2021, which claims the benefit and priority of Chinese Patent Application No. 202010727527.X, filed on Jul. 24, 2020, entitled as "FILTER ELEMENT FOR COUPLING ADSORPTION AND REGENERATION OF VOLATILE ORGANIC COMPOUNDS AND PURIFICATION DEVICE", the entire content of each of which is incorporated by reference herein.

TECHNICAL FIELD

The present disclosure relates to the technical field of exhaust gas purification, and in particular, to a filter element for coupling adsorption and regeneration of volatile organic compounds (referred briefly to as VOCs) and a purification device, which is particularly suitable for purification treatment of the exhaust gas of VOCs with low concentration and large air quantity.

BACKGROUND ART

VOCs are defined in physics as organic compounds with a vapor pressure greater than or equal to 0.01 KPa at a temperature of 20° C. From the perspective of air pollution prevention, VOCs refer to organic compounds participating in atmospheric photochemical reactions; or organic compounds that are determined through measurement or calculation according to a prescribed method.

To improve the purification efficiency of VOCs, existing prevention and treatment devices for the VOCs are mostly integrated with different purification technologies in series, and the different purification technologies are a pyrolysis method, a adsorption method, a photocatalytic method and so on. Existing adsorption and purification devices for the VOCs have technical problems such as large volume, large pressure drop, complex on-site regeneration technology and high construction and operation costs.

SUMMARY

An objective of the present disclosure is to provide a filter element for coupling adsorption and regeneration of volatile organic compounds and a purification device, which can at least alleviate one of technical problems of large volume, large pressure drop, complex on-site regeneration technology and high construction and operation costs.

The filter element for coupling adsorption and regeneration of volatile organic compounds provided in the present disclosure includes a filter element body, a photocatalytic mechanism and at least one adsorption-filtration body, wherein the at least one adsorption-filtration body is arranged in the filter element body and provided with a catalytic space, the photocatalytic mechanism is at least partially located in the catalytic space of the at least one adsorption-filtration body, the at least one adsorption-filtration body is configured to adsorb and filter the volatile organic compounds, and the photocatalytic mechanism is configured to perform photocatalytic purification treatment on the volatile organic compounds in the at least one adsorption-filtration body.

In a preferred embodiment, the photocatalytic mechanism includes an ultraviolet lamp and a heating mechanism; the at least one adsorption-filtration body includes one adsorption-filtration body; the one adsorption-filtration body is of a hollow columnar structure, the ultraviolet lamp is located in the hollow columnar structure of the one adsorption-filtration body and at a center of the filter element body; the one adsorption-filtration body abuts against an inner side wall of the filter element body; and the heating mechanism is arranged between the one adsorption-filtration body and the filter element body, and configured to heat the one adsorption-filtration body.

In a preferred embodiment, the photocatalytic mechanism includes a plurality of ultraviolet lamps and a heating mechanism; the at least one adsorption-filtration body includes a plurality of adsorption-filtration bodies; another catalytic space between adjacent two of the adsorption-filtration bodies is provided with one of the plurality of ultraviolet lamps at a center of the filter element body; the adsorption-filtration bodies abut against an inner side wall of the filter element body; and the heating mechanism is arranged between the adsorption-filtration bodies and the filter element body, and configured to heat the adsorption-filtration bodies.

In a preferred embodiment, the filter element body includes a porous catalytic sleeve; the porous catalytic sleeve is of a circular structure or a circular folded structure, and has a porosity not less than 30%.

In a preferred embodiment, the one adsorption-filtration body includes a first side mesh, adsorption-filtration layers and a second side mesh that are connected in sequence; the adsorption-filtration layers are located between the first side mesh and the second side mesh, and the first side mesh abuts against the heating mechanism.

In a preferred embodiment, each of the adsorption-filtration layers includes an activated carbon filter layer or a molecular sieve filter layer; the activated carbon filter layer includes at least one selected from a group consisting of granular activated carbon, honeycomb activated carbon, hollow columnar activated carbon and activated carbon fiber filter cotton; the molecular sieve filter layer includes at least one selected from another group consisting of a granular molecular sieve, a honeycomb molecular sieve and a hollow cylindrical molecular sieve.

In a preferred embodiment, the filter element further includes a handle cover-plate and an end cover sealing-plate that are oppositely arranged, the handle cover-plate is located at one end of the filter element body, the end cover sealing-plate is located at an other end of the filter element body, and the handle cover-plate and the end cover sealing-plate are separately connected to the filter element body; one side of the end cover sealing-plate which is close to the filter element body is provided with an ultraviolet-lamp power supply socket.

A purification device provided in the present disclosure includes a box body and the filter elements; the box body includes an air inlet, a filter cavity and an air outlet that are communicated with each other in sequence, and the filter elements for coupling adsorption and regeneration of volatile organic compounds are arranged in the filter cavity, so that a to-be-purified gas enters from the air inlet, flows through the filter elements for coupling adsorption and regeneration of volatile organic compounds and then is discharged from the air outlet.

In a preferred embodiment of the present disclosure, the filter cavity includes a first cavity and a second cavity that are communicated with each other, an inlet of the first cavity is communicated with the air inlet, and an outlet of the second cavity is communicated with the air outlet; the box body is internally provided with a plurality of filter element mounting holes corresponding to the first cavity; the filter elements for coupling adsorption and regeneration of volatile organic compounds are mounted in the filter element mounting holes in a one-to-one correspondence, such that a to-be-purified gas enters from the air inlet, passes through the plurality of filter elements for coupling adsorption and regeneration of volatile organic compounds, then flows through the second cavity and is discharged through the air outlet.

In a preferred embodiment of the present disclosure, each of the filter element mounting holes is provided with a filter-element guide rail; and each of the filter elements for coupling adsorption and regeneration of volatile organic compounds is mounted in a corresponding one of the filter element mounting holes through the filter-element guide rail.

In a preferred embodiment of the present disclosure, the filter cavity includes a first filter cavity, a second filter cavity, and a gas flow cavity; and the first filter cavity and the second filter cavity are located on two sides of the gas flow cavity, and separately communicated with the gas flow cavity; an inlet of the first filter cavity and an inlet of the second filter cavity are both communicated with the air inlet, an outlet of the first filter cavity and an outlet of the second filter cavity are both communicated with an inlet of the gas flow cavity, and an outlet of the gas flow cavity is communicated with the air outlet; the first filter cavity and the second filter cavity each are internally provided with a plurality of filter element mounting holes, and the filter elements for coupling adsorption and regeneration of volatile organic compounds are mounted in the filter element mounting holes in a one-to-one correspondence, such that a to-be-purified gas enters from the air inlet, passes through the plurality of filter elements for coupling adsorption and regeneration of volatile organic compounds, then flows through the gas flow cavity and is discharged through the air outlet.

In a preferred embodiment of the present disclosure, the purification device further includes at least one check valve, a constant temperature heating device and at least one regeneration circulating fan; the at least one regeneration circulating fan and the at least one check valve are arranged in one-to-one correspondence, each of the at least one check valve and a corresponding one of the at least one regeneration circulating fan are mounted in a respective one of filter element mounting holes of the filter cavity, and the at least one check valve each is configured to limit a unidirectional pressure relief direction in the filter cavity; the constant temperature heating device is located between the at least one check valve and the at least one regeneration circulating fan; and the constant temperature heating device is configured to heat air and indirectly heat the at least one adsorption-filtration body by using the air after being heated, so as to enable thermal desorption of the volatile organic compounds that are adsorbed.

In a preferred embodiment of the present disclosure, the purification device further includes a controller, a differential pressure sensor, a temperature sensor and an alarm device, wherein the differential pressure sensor, the temperature sensor and the alarm device are connected to the controller via electrical signals; the differential pressure sensor is arranged in the filter cavity, and the differential pressure sensor is located at an air outlet end of the filter elements for coupling adsorption and regeneration of volatile organic compounds, the differential pressure sensor is configured to detect a pressure drop difference signal in the filter cavity and output the pressure drop difference signal to the controller; and the temperature sensor is arranged at an air outlet end of the filter cavity, and configured to measure a temperature of an exhaust gas and transmit information of the temperature of the exhaust gas to the controller; the controller is respectively connected to the at least one check valve, the at least one regeneration circulating fan and the alarm device via other electrical signals; and the controller is configured to respectively control the at least one check valve, the at least one regeneration circulating fan and the alarm device according to the pressure drop difference signal in the filter cavity and the information of the temperature of the exhaust gas.

Compared with the prior art, the present disclosure has the following beneficial technical effects.

A filter element for coupling adsorption and regeneration of volatile organic compounds provided in the present disclosure includes a filter element body, a photocatalytic mechanism and at least one adsorption-filtration body; the at least one adsorption-filtration body is arranged in the filter element body; the at least one adsorption-filtration body is of a hollow columnar structure; and the photocatalytic mechanism is at least partially located inside the hollow columnar structure of the at least one adsorption-filtration body. The adsorption-filtration body(s) may be configured to adsorb and filter VOCs, and the photocatalytic mechanism is configured to perform photocatalytic purification treatment on the VOCs in the adsorption-filtration body(s). VOCs are quickly adsorbed by using the adsorption-filtration body(s), and thermal desorption and regeneration are performed on the adsorption-filtration body(s) during a time interval of stopping discharging of exhaust gas; and a photocatalysis technology is used to cyclically purify the VOCs that are thermally desorbed. In this way, the synergy of the high density and the purification in the two technologies is achieved. Furthermore, it takes full advantages of high adsorption, filtration and purification efficiency, low photolysis catalysis costs, and easy operation and maintenance of the on-site regeneration. In addition, the filter element for coupling adsorption and regeneration of volatile organic compounds has the technical effects of a compact structure, high purification efficiency, recyclable adsorption-filtration body(s), low secondary pollution, low costs and good economic benefits. So, technical problems of large volume, large pressure drop, complex on-site regeneration technology, and high construction and operation costs in the prior art are alleviated.

BRIEF DESCRIPTION OF THE DRAWINGS

To describe specific implementations of the present disclosure or the technical solutions in the prior art more clearly, the following briefly describes the accompanying drawings required for describing the specific implementations or the prior art. Apparently, the accompanying drawings in the following description show merely some implementations of the present disclosure, and a person of ordinary skill in the art may derive other accompanying drawings from these accompanying drawings without creative efforts.

Figure 1:
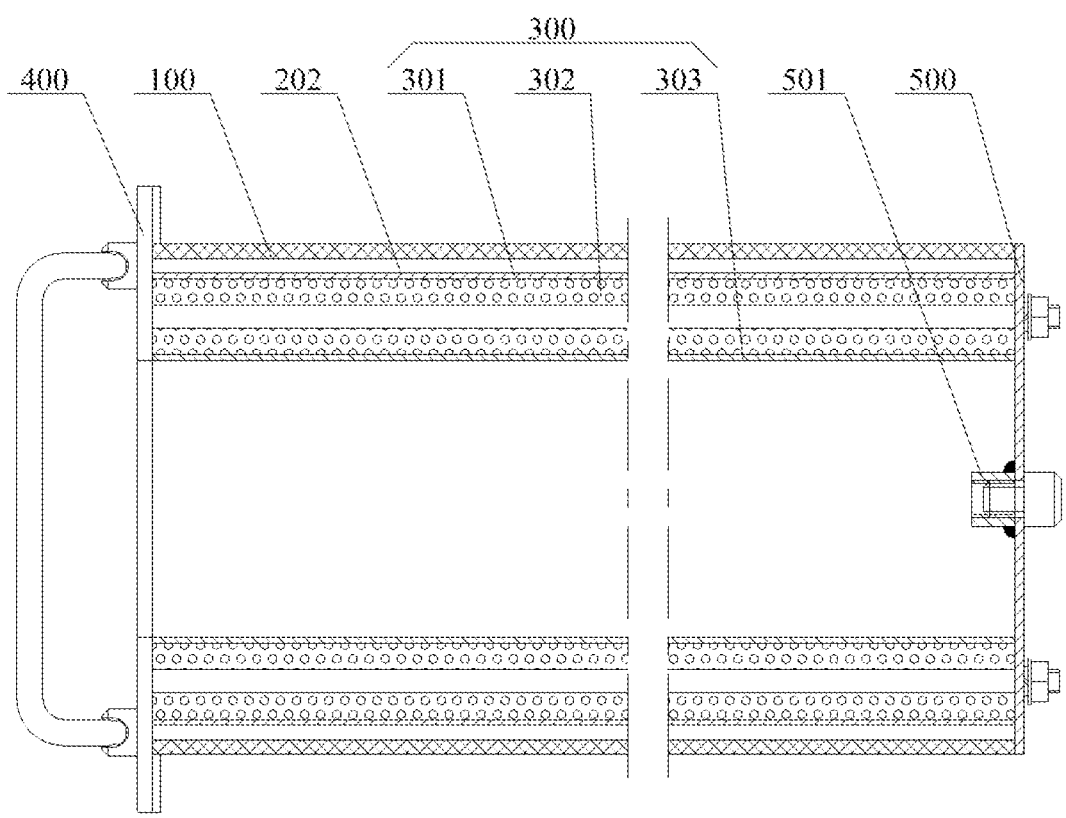
FIG. 1 is a schematic structural diagram of a filter element for coupling adsorption and regeneration of volatile organic compounds according to an embodiment of the present application.
Figure 2:
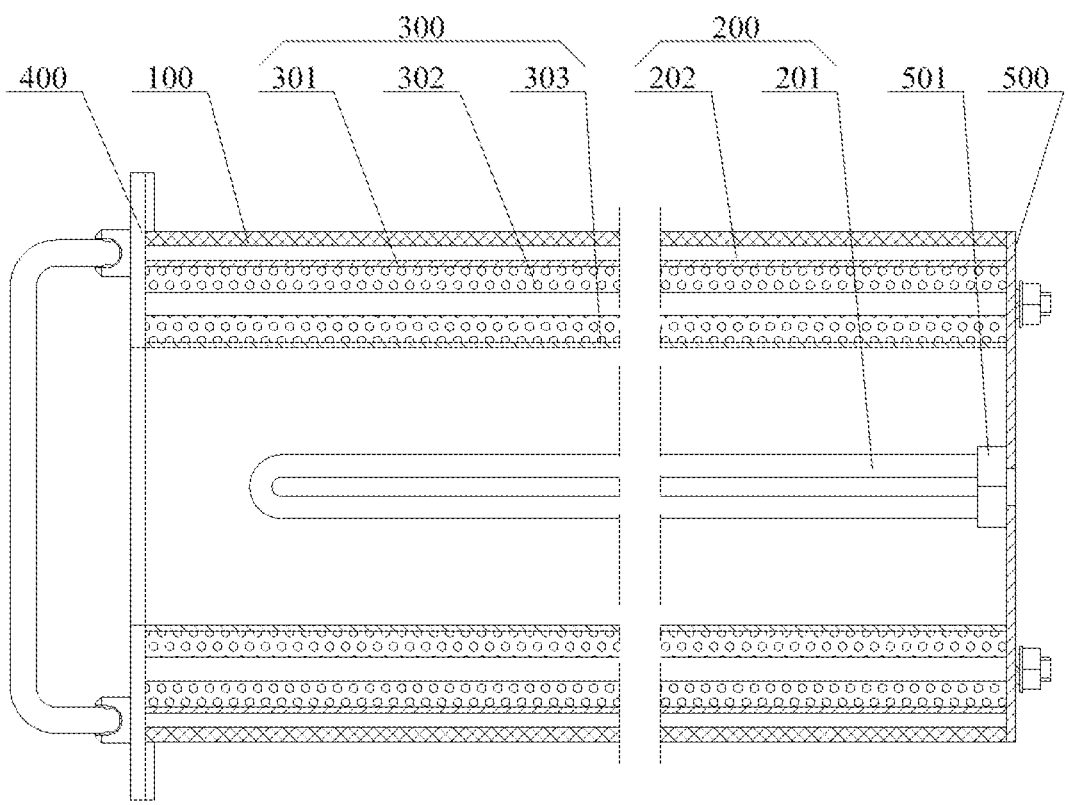
FIG. 2 is another schematic structural diagram of a filter element for coupling adsorption and regeneration of volatile organic compounds having an ultraviolet lamp according to an embodiment of the present application.
Figure 3:
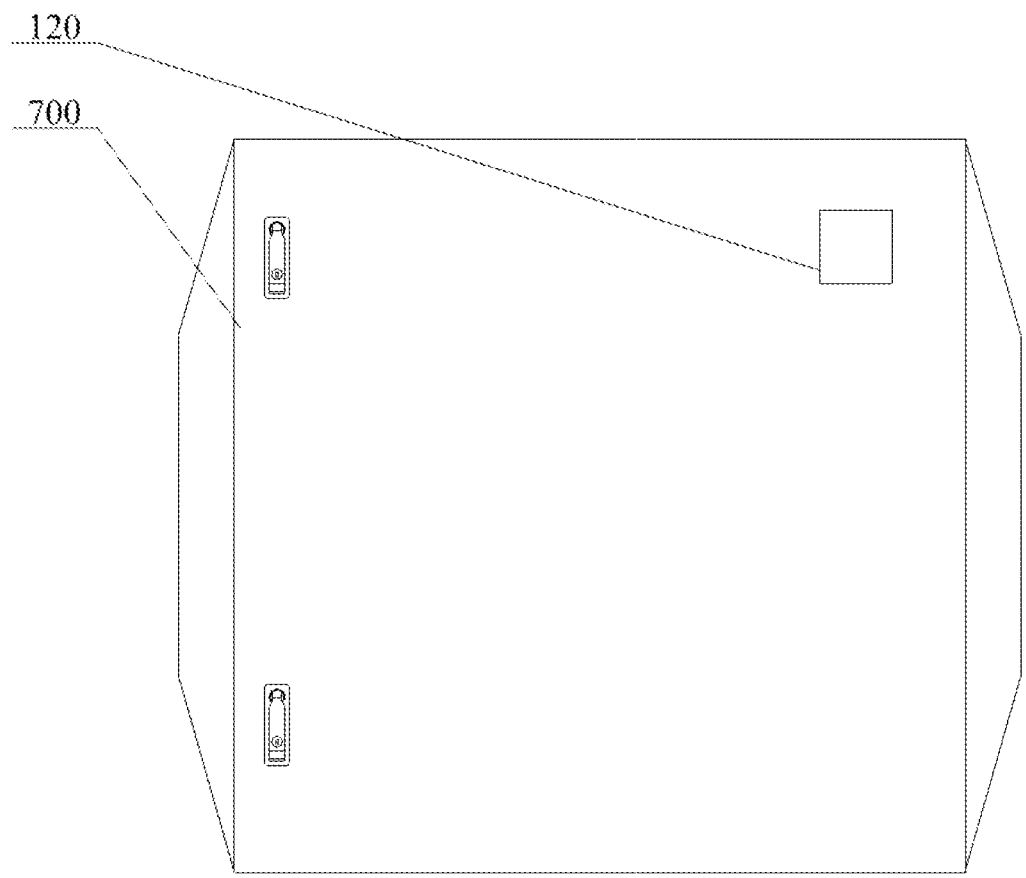
FIG. 3 is a schematic diagram of an external structure of a purification device according to an embodiment of the present application.
Figure 4:
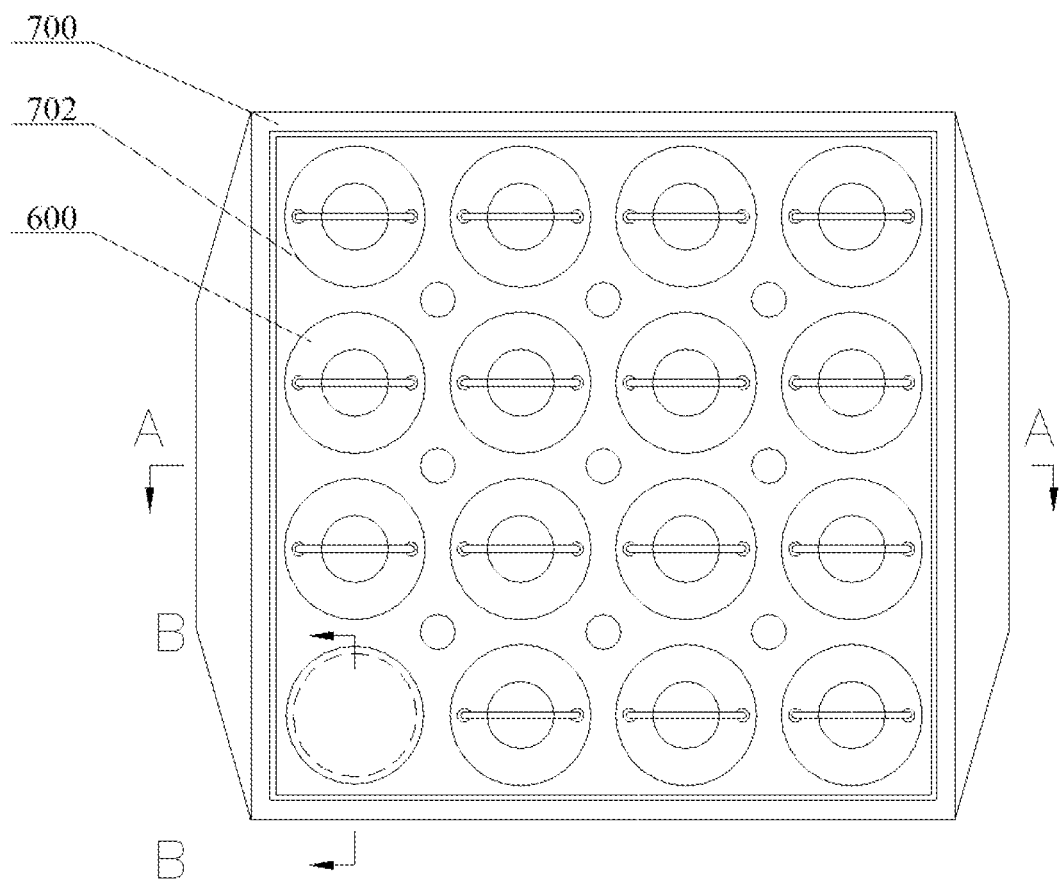
FIG. 4 is a schematic diagram of an internal structure of a purification device according to an embodiment of the present application.
Figure 5:
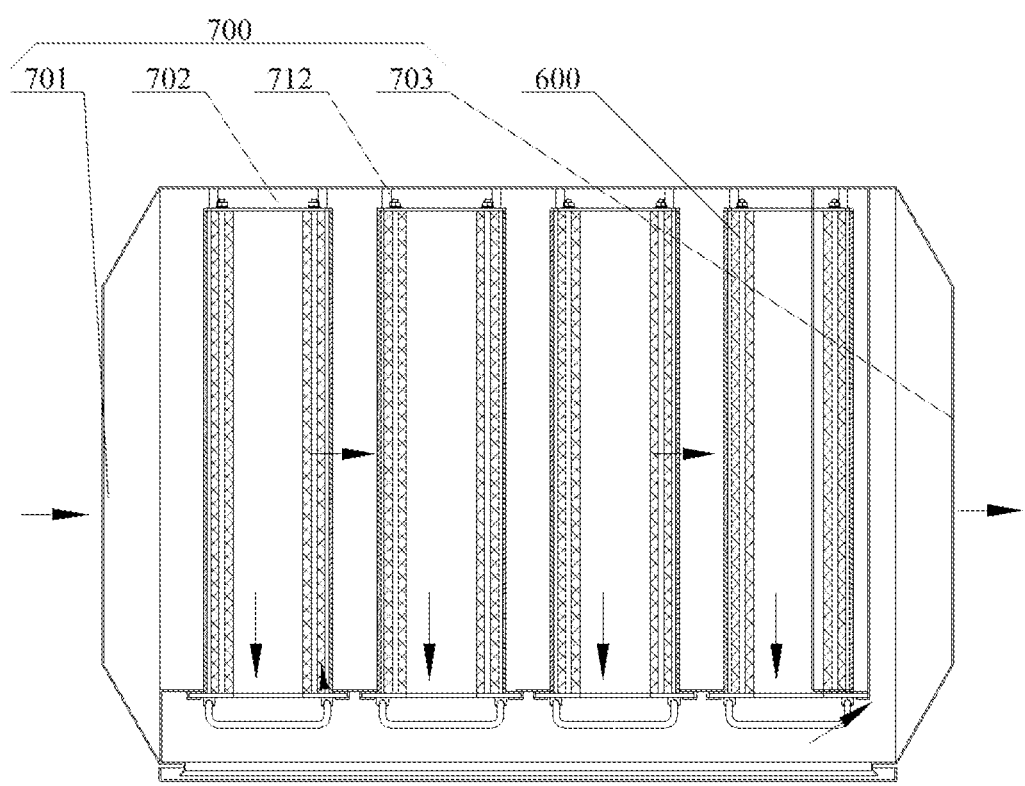
FIG. 5 is a sectional view of the purification device taken along a line A-A in FIG. 4 according to an embodiment of the disclosure.

Reference signs in the drawings: 100: filter element body; 200: photocatalytic mechanism; 201: ultraviolet lamp; 202: heating mechanism; 300: adsorption-filtration body; 301: first side mesh; 302: adsorption-filtration layer; 303: second side mesh; 400: handle cover-plate; 500: end cover sealing-plate; 501: ultraviolet-lamp power supply socket; 600: filter element for coupling adsorption and regeneration of volatile organic compounds; 700: box body; 701: air inlet; 702: filter cavity; 712: filter-element guide rail 722: first cavity; 742: first filter cavity; 752: second filter cavity; 762: gas flow cavity; 703: air outlet; 800: self-sealing air duct; 900: exhaust fan; 110: controller; 120: differential pressure sensor; 130: temperature sensor; 140: alarm device.

DETAILED DESCRIPTION OF THE EMBODIMENTS

The following clearly and completely describes the technical solutions of the present disclosure with reference to embodiments. Apparently, the described embodiments are some rather than all of the embodiments. All other embodiments obtained by a person of ordinary skill in the art based on the embodiments of the present disclosure without creative efforts shall fall within the protection scope of the present disclosure.

It should be noted that in terms of photochemical definition, VOCs refer to organic compounds participating in atmospheric photochemical reactions, or organic compounds that are determined through measurement or calculation according to a prescribed method. Generally, VOCs include non-methane hydrocarbons (alkanes, alkenes, alkynes, aromatic hydrocarbons, etc.), oxygen-containing organics (aldehydes, ketones, alcohols, ethers, etc.), chlorine-containing organics, nitrogen-containing organics, sulfur-containing organics, etc. The VOCs are an important precursor for the formation of ozone ($O_3$) and fine particulate matter (PM2.5) pollution. VOCs are the second most widely distributed and complex types of air pollutants in addition to particulate matter. The VOCs are harmful to an ecological environment system and human health mainly in three aspects: first, some species of VOCs are toxic and carcinogenic, which is harmful to the human health; second, VOCs participate in the atmospheric photochemical reaction together with nitrogen oxides to cause ozone pollution; and third, VOCs after undergoing chemical reactions generate secondary aerosols, which is an important precursor for forming PM2.5. Control and reduction of emissions of VOCs from various pollution sources is an important way to decrease concentration levels of the atmospheric ozone and PM2.5 to improve air quality.

Treatment methods for VOCs mainly include a condensation method, a thermal catalytic oxidation method, an activated carbon adsorption method, a molecular sieve rotor adsorption method, a UV (ultraviolet) method, a photocatalytic method, etc. The activated carbon or molecular sieve adsorption method is a conventional classic technology in the treatment for VOCs. The principle thereof is as follows. The exhaust gas is enabled to be in contact with a porous activated carbon adsorbent with a large surface by using activated carbon or molecular sieve with characteristics of a plurality of microporous structures, large specific surface area and strong adsorption capacity, so that pollutants in the exhaust gas are adsorbed on an inner surface of the activated carbon or the molecular sieve to separate the pollutants from the gas. In this way, the purified gas is discharged at high altitude, and the purification efficiency may reach more than 90%. However, the activated carbon or molecular sieve adsorption method has the shortcomings that high temperature regeneration or replacement is required after saturated adsorption, thereby resulting in high construction and operation costs, as well as complexity. In addition, the photocatalytic oxidation is a widely applied and low-cost technology for treating the exhaust gas of VOCs. A photocatalytic purification device mainly uses an ultraviolet photolysis technology and a catalytic oxidation technology. Under the action of ultraviolet light, the photocatalysis is activated to generate highly oxidizing substances such as ozone and hydroxyl radicals (OH) both with high activity. The highly oxidizing substances undergo complex photolysis reactions, oxidation and catalytic reactions together with VOCs molecules in the exhaust gas. So, VOCs are gradually degraded into $CO_2$ and water.

Main factors affecting the efficiency of photocatalytic treatment of VOCs are the wavelength and intensity of the UV, a temperature of the flue gas, the concentration of the VOCs, the relative humidity, the retention time, the reaction medium, etc. Existing photocatalytic devices all use the straight-through illumination purification. Especially, for the large air quantity of exhaust gas, insufficient retention time is a main reason for low purification efficiency or a larger volume. Generally, vacuum ultraviolet lamps with bands of 185 nm and 254 nm are selected. A distance between the ultraviolet lamp and the photocatalytic body is generally not greater than 5 cm. Existing adsorption purification devices and photocatalytic devices for VOCs are mostly used separately or used hierarchically in series. The disadvantages of these devices are the large volume and the high pressure drop. The existing adsorption purification and regeneration device of the activated carbon or the molecular sieve is high in construction and operation cost, which is difficult to popularize and use in small and medium emission sources of VOCs. To alleviate the above-mentioned technical problems, a filter element for coupling adsorption and regeneration of volatile organic compounds 600 is provided.

As shown in FIG. 1 to FIG. 8, the filter element for coupling adsorption and regeneration of volatile organic compounds 600 provided by this embodiment includes: a filter element body 100, a photocatalytic mechanism 200 and adsorption-filtration body(s) 300. The adsorption-filtration body(s) 300 may be arranged in the filter element body 100, and the adsorption-filtration body(s) 300 may be provided with a catalytic space. The photocatalytic mechanism 200 is at least partially located in the catalytic space of the adsorption-filtration body(s) 300. The adsorption-filtration body 300 is configured to adsorb and filter VOCs. The photocatalytic mechanism 200 is configured to perform photocatalytic purification treatment on the VOCs in the adsorption-filtration body 300(s).

It should be noted that in the filter element for coupling adsorption and regeneration of volatile organic compounds 600 provided by this embodiment, the filter element body 100 may have a composite cylindrical structure, which can perform adsorption and photocatalytic regeneration on VOCs. Specifically, the VOCs are quickly adsorbed by using the adsorbent in the adsorption-filtration body(s) 300, then thermal desorption and regeneration are performed on the adsorbent in the adsorption-filtration body(s) 300 during a time interval of stopping discharging of the exhaust gas, and a photocatalysis technology is used to cyclically purify the VOCs that are thermally desorbed. In this way, the synergy of the high density and the purification in the two technologies is achieved.

In a preferred embodiment of the present disclosure, the filter element body 100 includes a porous catalytic sleeve. The porous catalytic sleeve is of a circular structure or a circular folded structure, and has a porosity that is generally not less than 30%.

Optionally, a basis material of the porous catalytic sleeve may use porous heat-resistant materials such as foam ceramics, honeycomb ceramics, microporous metal honeycomb panels, and glass fibers. The materials of the porous catalytic sleeve have the capability of high porosity, large specific surface area, thermal shock resistance, high temperature resistance, corrosion resistance and good mechanical strength and particle filtering. The surface of the porous catalytic sleeve is coated with anatase $TiO_2$ or element-doped $TiO_2$ photocatalyst, so that a photocatalytic effect generated after the porous catalytic sleeve is irradiated by ultraviolet rays is used to degrade harmful gases and some inorganic compounds in exhaust gas or the air, thereby achieving the purification. The anatase nano-$TiO_2$ has the effects of the photolysis and the self-purification, which is used to improve the purification efficiency of a purification device for VOCs and prolong the maintenance time.

It should be noted that the catalytic space of the adsorption-filtration body 300 may be an internal space of a single one adsorption-filtration body 300, or may be a clearance space between any adjacent two adsorption-filtration bodies 300. Specifically, in a preferred embodiment of the present disclosure, the photocatalytic mechanism 200 includes an ultraviolet lamp 201 and a heating mechanism 202. The adsorption-filtration body 300 is of a hollow columnar structure. The ultraviolet lamp 201 is located inside the hollow columnar structure of the adsorption-filtration body 300. The ultraviolet lamp 201 is located at a center of the filter element body 100. The adsorption-filtration body 300 abuts against an inner side wall of the filter element body 100. The heating mechanism 202 is arranged between the adsorption-filtration body 300 and the filter element body 100, and configured to heat the adsorption-filtration body 300.

In addition, in a preferred embodiment of the present disclosure, the photocatalytic mechanism 200 includes ultraviolet lamps 201 and a heating mechanism 202. A plurality of adsorption-filtration bodies 300 are provided. The ultraviolet lamps 201 are located in a catalytic space between adjacent two adsorption-filtration bodies 300. The ultraviolet lamps 201 are located at the center of the filter element body 100. The adsorption-filtration bodies 300 abut against an inner side wall of the filter element body 100. The heating mechanism 202 is arranged between the adsorption-filtration bodies 300 and the filter element body 100, and configured to heat the adsorption-filtration bodies 300.

In this embodiment, the ultraviolet lamp 201 can radiate ultraviolet rays from the center of the filter element body 100 to the surroundings. After the ultraviolet rays are irradiated on the surface of the porous catalytic sleeve, the anatase $TiO_2$ or the element-doped $TiO_2$ photocatalyst that are coated on the surface of the porous catalytic sleeve is used, so that a photocatalytic effect generated after the anatase $TiO_2$ or the element-doped $TiO_2$ photocatalyst is irradiated by ultraviolet rays is used to degrade harmful gases and partial inorganic compounds in exhaust gas or the air, so as to achieve purification.

Optionally, the heating mechanism 202 is configured to heat the adsorption-filtration body(s) 300, which can implement thermal desorption on adsorbed VOCs and accelerate the catalytic oxidation reaction of VOCs with high boiling points in the adsorbent of the adsorption-filtration body(s) 300. The heating mechanism 202 may be a heating plate, and a heating temperature of the heating plate is not higher than 100° C.

A filter element for coupling adsorption and regeneration of volatile organic compounds 600 provided in this embodiment includes a filter element body 100, a photocatalytic mechanism 200 and adsorption-filtration body(s) 300. The adsorption-filtration body(s) 300 may be arranged in the filter element body 100. The adsorption-filtration body(s) 300 may be of a hollow columnar structure, and the photocatalytic mechanism 200 is at least partially located inside the hollow columnar structure of the adsorption-filtration body(s) 300. The adsorption-filtration body 300 is configured to adsorb and filter VOCs, and the photocatalytic mechanism 200 is configured to perform photocatalytic purification treatment on the VOCs in the adsorption-filtration body(s) 300. VOCs are quickly adsorbed by using the adsorption-filtration body(s) 300, then the thermal desorption and the regeneration are performed on the adsorption-filtration body(s) 300 during a time interval of stopping discharging of exhaust gas, and a photocatalysis technology is used to cyclically purify the VOCs that are thermally desorbed. In this way, the synergy of the high density and the purification in the two technologies is achieved. Furthermore, it takes full advantages of high adsorption, filtration and purification efficiency, low photolysis catalysis costs, and easy operation and maintenance of the on-site regeneration. In addition, the filter element for coupling adsorption and regeneration of volatile organic compounds has the technical effects of a compact structure, high purification efficiency, a recyclable adsorption-filtration body(s) 300, low secondary pollution, low costs and good economic benefits. So, technical problems of large volume, large pressure drop, complex on-site regeneration technology, and high construction and operation costs in the prior art are alleviated.

On the basis of the foregoing embodiment, further, in a preferred embodiment of the present disclosure, the adsorption-filtration body 300 includes a first side mesh 301, adsorption-filtration layers 302, and a second side mesh 303 (it also is referred to as a porous catalytic sleeve) that are connected in sequence. The adsorption-filtration layers 302 are located between the first side mesh 301 and the second side mesh 303. The first side mesh 301 abuts against the heating mechanism 202.

The first side mesh 301 is an outer fixing mesh. The heating mechanism 202 and the adsorption-filtration layers 302 are closely attached and fixed together by the first side mesh, based on the first side mesh having filter holes. Similarly, the second side mesh 303 is an inner fixed mesh, which is mainly configured to fix the adsorption-filtration layers 302.

In a preferred embodiment of the present disclosure, the adsorption-filtration layer 302 includes an activated carbon filter layer or a molecular sieve filter layer. The activated carbon filter layer includes at least one selected from the group consisting of granular activated carbon, honeycomb activated carbon, hollow columnar activated carbon and activated carbon fiber filter cotton. The molecular sieve filter layer includes at least one selected from the group consisting of a granular molecular sieve, a honeycomb molecular sieve and a hollow cylindrical molecular sieve.

Optionally, a plurality of adsorption-filtration layers 302 may be provided, and the plurality of adsorption-filtration layers 302 may be made of different materials, so as to adsorb VOCs more comprehensively. To ensure the stability of the plurality of adsorption-filtration layers 302, reinforcing rods may be arranged between the plurality of adsorption-filtration layers 302.

In a preferred embodiment of the present disclosure, the filter element for coupling adsorption and regeneration of volatile organic compounds further includes a handle cover-plate 400 and an end cover sealing-plate 500 that are oppositely arranged. The handle cover-plate 400 is located at one end of the filter element body 100, and the end cover sealing-plate 500 is located at the other end of the filter element body 100. The handle cover-plate 400 and the end cover sealing-plate 500 are separately connected to the filter element body 100. One side of the end cover sealing-plate 500 which is close to the filter element body 100 is provided with an ultraviolet-lamp power supply socket 501.

Since the filter element body 100 has a tubular structure, in order to ensure the sealing of the overall structure, the handle cover-plate 400 and the end cover sealing-plate 500 that are oppositely disposed are arranged at two ends of the opening of the filter element body 100 respectively. The handle end-cover is detachably connected to the filter element body 100, and the end cover sealing-plate 500 is detachably connected to the filter element body 100.

Optionally, in order to ensure continuous power supply of the ultraviolet lamp 201, the ultraviolet-lamp power supply socket 501 may be arranged on an inner side of the end cover sealing-plate 500. The ultraviolet-lamp power supply socket 501 is located at the center of the filter element body 100. After the ultraviolet lamp 201 is inserted in the ultraviolet-lamp power supply socket 501, the ultraviolet lamp 201 is located at the center of the filter element body 100, so that ultraviolet rays can be irradiated on the surface of the adsorption-filtration body 300 more uniformly.

Optionally, a handle may be arranged on one side of the handle cover-plate 400 which is away from the filter element body 100, and the handle may be fixed in a hinged manner. When the lift up operation is performed by the handle, the handle is arranged vertically. When the handle is not used, the handle may be laid horizontally, thereby saving space.

A purification device provided by the present disclosure includes a box body 700 and filter elements for coupling adsorption and regeneration of volatile organic compounds 600. The box body 700 includes an air inlet 701, a filter cavity 702 and an air outlet 703 that are connected in sequence. The filter elements for coupling adsorption and regeneration of volatile organic compounds 600 are arranged in the filter cavity 702, so that a gas to be purified enters from the air inlet 701, flows through the filter elements for coupling adsorption and regeneration of volatile organic compounds 600 and then is discharged from the air outlet 703.

Optionally, the filter cavity 702 may be specifically set for different usage scenarios. In a preferred embodiment of the present disclosure, the filter cavity 702 includes a first cavity 722 (including a first filter cavity 742 and a second filter cavity 752 below) and a second cavity that are communicated with each other. An inlet of the first cavity 722 is communicated with the air inlet 701. An outlet of the second cavity is communicated with the air outlet 703. The box body 700 is internally provided with a plurality of filter element mounting holes corresponding to the first cavity 722. A plurality of filter elements for coupling adsorption and regeneration of volatile organic compounds 600 are provided. The filter elements for coupling adsorption and regeneration of volatile organic compounds 600 are mounted in the filter element mounting holes in a one-to-one correspondence. So, a gas to be purified can enter from the air inlet 701, pass through the plurality of filter elements for coupling adsorption and regeneration of volatile organic compounds 600, then flow through the second cavity and can be discharged through the air outlet 703.

Optionally, each of the filter elements for coupling adsorption and regeneration of volatile organic compounds 600 includes a handle cover-plate 400 and an end cover sealing-plate 500 that are oppositely disposed. The handle cover-plate 400 and the box body 700 are sealed. The handle cover-plate 400 is opened with a first air vent, so that a gas to be purified flows into the second cavity through the filter element body 100. The handle cover-plate 400 is sealed together with the box body 700 through a rubber part, and the end cover sealing-plate 500 is sealed.

In addition, when a catalytic space between adjacent two adsorption-filtration bodies 300 is provided with the ultraviolet lamp 201, the box body may be internally provided with mounting holes of the ultraviolet lamps 201 and a power supply device. A gap between the filter element mounting holes is provided with the mounting hole of the ultraviolet lamp.

In a preferred embodiment of the present disclosure, filter-element guide rails 712 are arranged in the filter element mounting holes, and the filter elements for coupling adsorption and regeneration of volatile organic compounds 600 are mounted in the filter element mounting holes through the filter-element guide rails 712.

When the filtration with the large air quantity is performed, in a preferred embodiment of the present disclosure, the filter cavity 702 includes a first filter cavity 742, a second filter cavity 752, and a gas flow cavity 762 (it also is referred to as the second cavity). The first filter cavity 742 and the second filter cavity 752 are located on two sides of the gas flow cavity 762, and separately communicated with the gas flow cavity 762. An inlet of the first filter cavity 742 and an inlet of the second filter cavity 752 are both communicated with the air inlet 701. An outlet of the first filter cavity 742 and an outlet of the second filter cavity 752 are both communicated with an inlet of the gas flow cavity 762. An outlet of the gas flow cavity 762 is communicated with the air outlet 703. The first filter cavity 742 and the second filter cavity 752 are each internally provided with a plurality of filter element mounting holes. A plurality of filter elements for coupling adsorption and regeneration of volatile organic compounds 600 are provided. The filter elements for coupling adsorption and regeneration of volatile organic compounds 600 are mounted in the filter element mounting holes in a one-to-one correspondence. In this way, a gas to be purified enters from the air inlet 701, passes through the plurality of filter elements for coupling adsorption and regeneration of volatile organic compounds 600, then flows through the gas flow cavity 762 and is discharged through the air outlet 703.

Filter-element guide rails 712 are also provided in the filter element mounting holes formed in both the first filter cavity 742 and the second filter cavity 752. The filter elements for coupling adsorption and regeneration of volatile organic compounds 600 are mounted in the filter element mounting holes through the filter-element guide rails 712.

In a preferred embodiment of the present disclosure, the purification device further includes check valve(s), a constant temperature heating device and regeneration circulating fan(s). At least one check valve is provided. The number of the regeneration circulating fan(s) may be set in manner of corresponding to the number of the check valve(s). That is, the at least one regeneration circulating fan and the at least one check valve are arranged in one-to-one correspondence. Each of the check valve(s) and a corresponding one of the regeneration circulating fan(s) are mounted in a respective one of filter element mounting holes of the filter cavity 702. The check valve is configured to limit a unidirectional pressure relief direction in the filter cavity 702. The constant temperature heating device is an optional device that is located between the check valve(s) and the regeneration circulating fan(s). The constant temperature heating device is configured to heat air and indirectly heat the adsorption-filtration body by using heated air, so as to enable thermal desorption of adsorbed VOCs.

In addition, in a preferred embodiment of the present disclosure, the purification device further includes an exhaust fan 900. The exhaust fan 900 may be arranged in the box body 700. The exhaust fan 900 can ensure that a gas to be purified is conveyed from the air inlet 701 to an exhaust port along an output direction of the exhaust fan 900.

Figure 6:
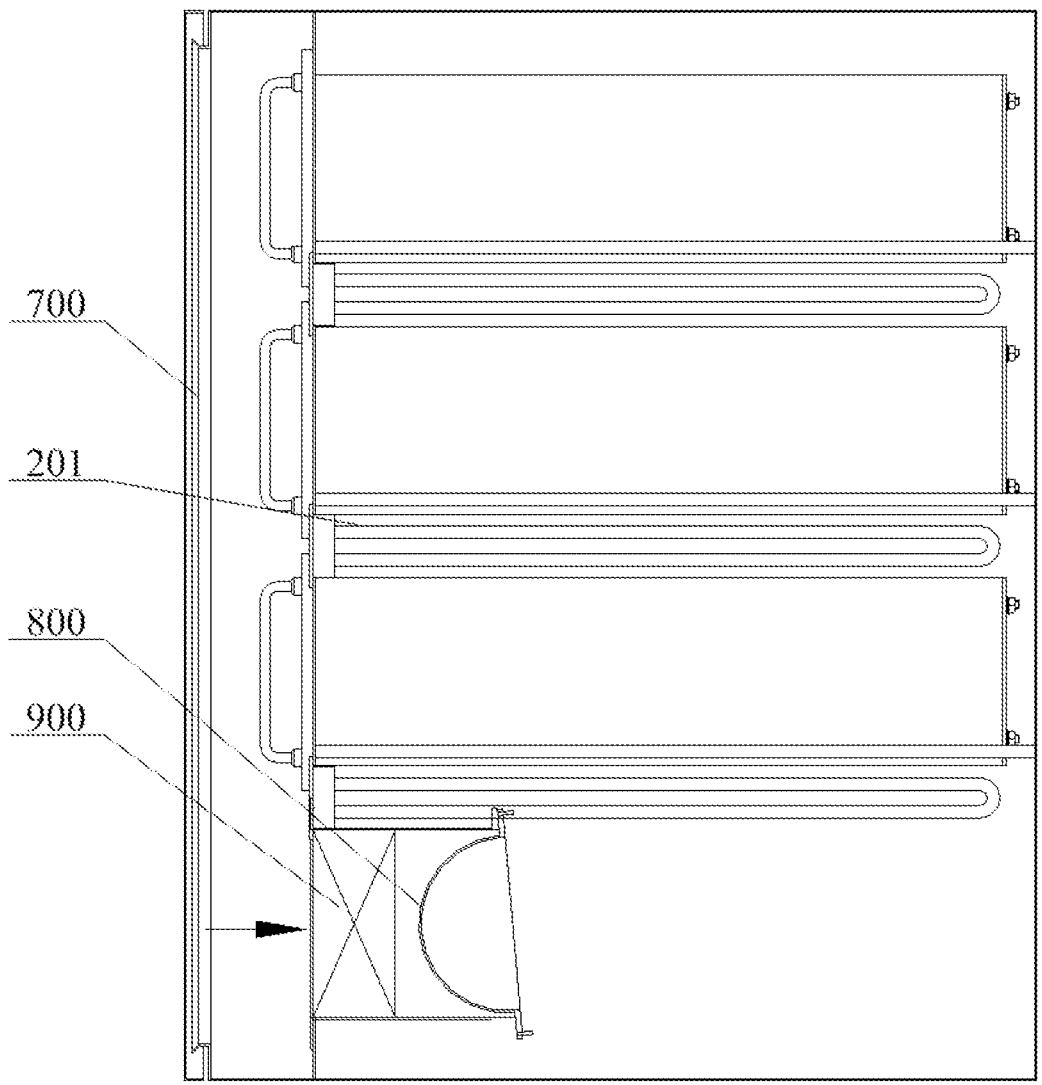
FIG. 6 is a sectional view of the purification device taken along a line B-B in FIG. 4 according to an embodiment of the disclosure.
Figure 7:
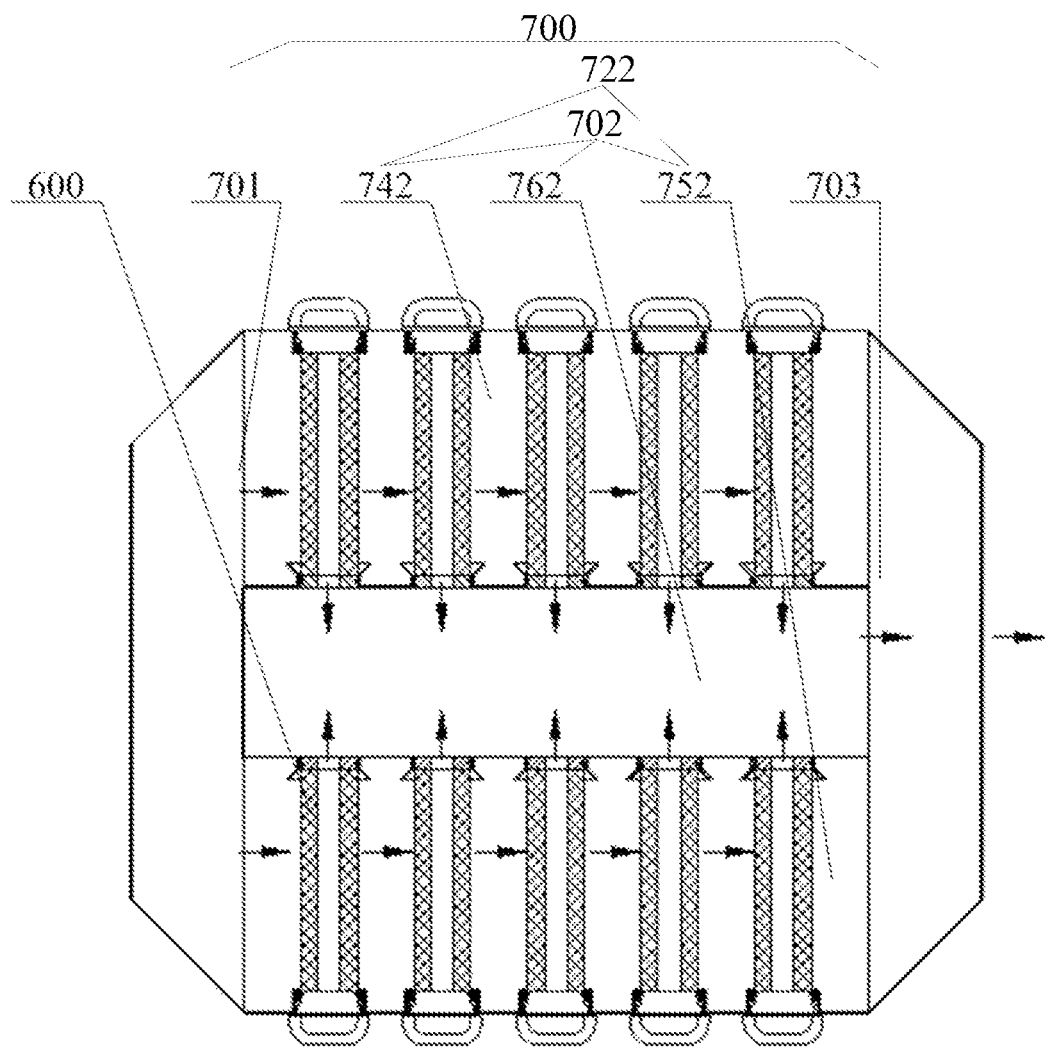
FIG. 7 is another schematic diagram of an internal structure of a purification device according to an embodiment of the present application.
Figure 8:
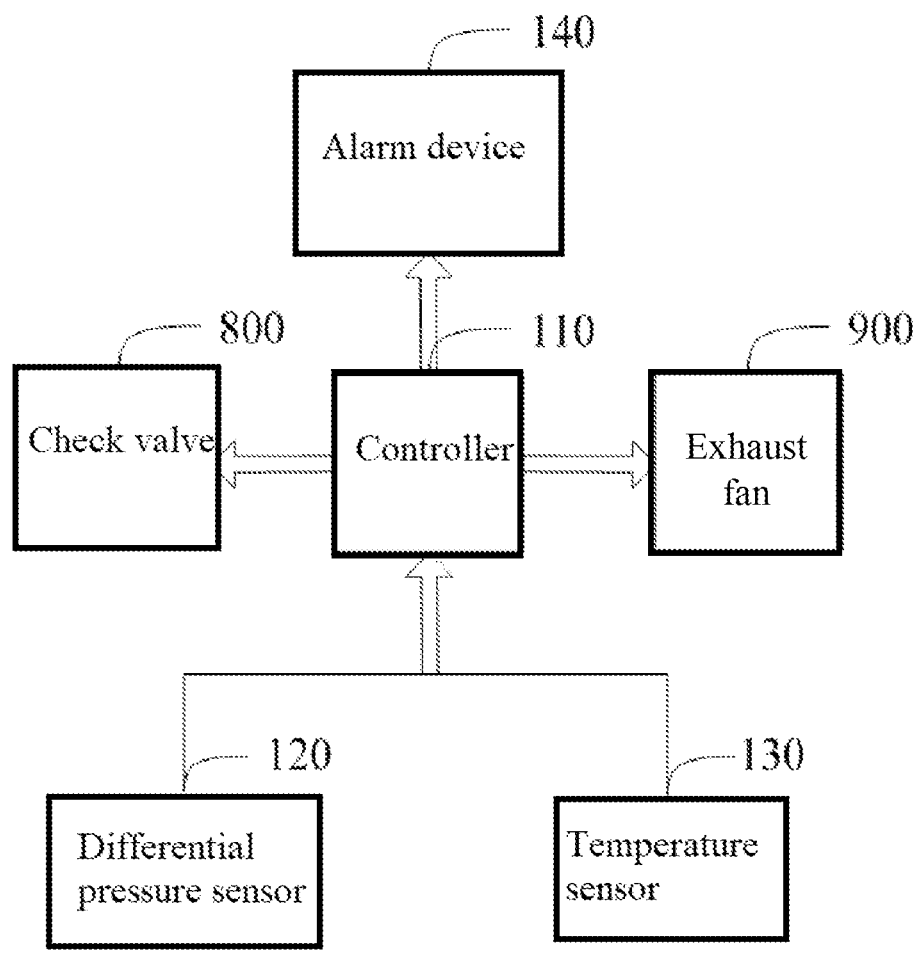
FIG. 8 is a structural block diagram of a purification device according to an embodiment of the present application.

As shown in FIG. 6, the exhaust fan 900 may let the wind in along a direction indicated by the arrow during operation. A self-sealing air duct 800 achieves the sealing of the air duct under the action of its own weight and the air pressure.

In a preferred embodiment of the present disclosure, the purification device further includes a controller 110, a differential pressure sensor 120, a temperature sensor 130 and an alarm device 140. The sensor (i.e., the differential pressure sensor 120 and the temperature sensor 130) and the alarm device 140 are all connected to the controller 110 via electrical signals. The differential pressure sensor 120 is arranged in the filter cavity 702, and located at an air outlet end of the filter elements for coupling adsorption and regeneration of volatile organic compounds 600. The differential pressure sensor 120 is configured to detect a pressure drop difference signal in the filter cavity 702 and to output this pressure drop difference signal to the controller 110. The temperature sensor 130 is arranged at an air outlet end of the filter cavity 702, and is configured to measure a temperature of an exhaust gas and transmit temperature information of the exhaust gas to the controller 110. The controller 110 is connected to the check valve(s), the regeneration circulating fan(s) and the alarm device 140 via electrical signals. The controller 110 is configured to control the check valve(s), the regeneration circulating fan(s) and the alarm device 140 according to the pressure drop difference signal in the filter cavity 702 and the temperature information of the exhaust gas.

In this embodiment, when the temperature of the exhaust gas is greater than 120° C., the controller 110 turns on the exhaust gas fan(s) to discharge the high-temperature exhaust gas that is regenerated, so as to prevent the activated carbon catalyst from igniting and to prevent from occurring fire accidents. The controller 110 is configured to control states of the check valve(s) or the alarm device 140 according to signals separately output by the differential pressure sensor 120 and the temperature sensor 130.

Optionally, multiple types of controllers 110 may be provided, for example, a MCU (microcontroller unit), a computer and a PLC. Preferably, the controller 110 is the MCU.

The MCU, which is also known as single-chip microcomputer, is a chip-level computer formed by appropriately reducing the frequency and specifications of a central processing unit, and integrating peripheral interfaces of a memory, a counter, a USB, an A/D converter, a UART, a PLC, a DMA and so on, as well as even an LCD drive circuit on a single chip. So, different combinations are performed to control different applications.

Preferably, the controller 110 is a single-chip microcomputer, a model of which is a model STM32F103C8T6. This single-chip microcomputer has strong processing capability and abundant internal resources, and operates stably.

The purification device provided in this embodiment has two operating states as follows.

Operating state 1: in an adsorption operating state, the exhaust fan 900 is normally started, a check valve of the flue gas in front of the first cavity 722 is opened by a negative pressure suction; the purified exhaust gas passes through the first cavity 722 and the first air vent, passes through the photocatalytic mechanism 200 and the adsorption-filtration body(s) 300, then is discharged to the second cavity, and is discharged to the outside by the exhaust fan 900.

Operating state 2: in a self-purification state, the exhaust fan 900 is closed or started by a small air quantity; the ultraviolet lamp(s) 201 may be turned on; the check valve of the flue gas in front of the first cavity 722 is closed or has a small opening due to insufficient stress; the check valve(s) and internal circulating fan(s) in the box body 700 are started to prevent self-purifying exhaust gas from flowing back, and the air quantity is about 10% of the operating air quantity; the circulating air passes through the photocatalytic mechanism 200, so that after the VOCs that are adsorbed on the adsorption-filtration body(s) 300 are cyclically purified in the box body 700, and the on-site regeneration of the adsorption-filtration body(s) is implemented; and the exhaust gas is discharged to the outside after being naturally heated or discharged to the outside with a small air quantity in the purification process.

The purification device provided in this embodiment can implement the purification that integrates the filtration of the air and the exhaust gas as well as VOCs adsorption, which has high overall purification efficiency and low use costs, reduces secondary ozone pollution, and is suitable for popularization and use.

Finally, it should be noted that the above embodiments are only used to illustrate the technical solutions of the present disclosure, rather than constituting a limitation thereto. Although the present disclosure has been described in detail with reference to the above-mentioned embodiments, it should be understood by a person of ordinary skill in the art that he/she can still modify the technical solutions described in the above-mentioned embodiments or equivalently replace some or all technical features therein; and these modifications or replacements do not cause the essence of the corresponding technical solutions to depart from the scope of the technical solutions of various embodiments of the present disclosure.

What is claimed is:

1. A filter element for coupling adsorption and regeneration of volatile organic compounds, the filter element comprising a filter element body, a photocatalytic mechanism and at least one adsorption-filtration body, wherein
the at least one adsorption-filtration body is arranged in the filter element body and provided with a catalytic space, the photocatalytic mechanism is at least partially located in the catalytic space of the at least one adsorption-filtration body, the at least one adsorption-filtration body is configured to adsorb and filter the volatile organic compounds, the photocatalytic mechanism is configured to perform photocatalytic purification treatment on the volatile organic compounds in the at least one adsorption-filtration body;
wherein the photocatalytic mechanism comprises an ultraviolet lamp and a heating mechanism; and
wherein the at least one adsorption-filtration body comprises one adsorption-filtration body, the one adsorption-filtration body is of a hollow columnar structure, the ultraviolet lamp is located in the hollow columnar structure of the one adsorption-filtration body and at a center of the filter element body; the one adsorption-filtration body abuts against an inner side wall of the filter element body, and the heating mechanism is arranged between the one adsorption-filtration body and the filter element body and configured to heat the one adsorption-filtration body.

2. The filter element for coupling adsorption and regeneration of volatile organic compounds according to claim 1, wherein the photocatalytic mechanism comprises a plurality of ultraviolet lamps and the heating mechanism;
the at least one adsorption-filtration body comprises a plurality of adsorption-filtration bodies; another catalytic space between adjacent two of the adsorption-filtration bodies is provided with one of the plurality of ultraviolet lamps at a center of the filter element body; the adsorption-filtration bodies abut against an inner side wall of the filter element body; and the heating mechanism is arranged between the adsorption-filtration bodies and the filter element body, and configured to heat the adsorption-filtration bodies.

3. The filter element for coupling adsorption and regeneration of volatile organic compounds according to claim 1, wherein the filter element body comprises a porous catalytic sleeve;
the porous catalytic sleeve is of a circular structure or a circular folded structure, and has a porosity not less than 30%.

4. The filter element for coupling adsorption and regeneration of volatile organic compounds according to claim 3, wherein the one adsorption-filtration body comprises a first side mesh, adsorption-filtration layers and a second side mesh that are connected in sequence;
the adsorption-filtration layers are located between the first side mesh and the second side mesh, and the first side mesh abuts against the heating mechanism.

5. The filter element for coupling adsorption and regeneration of volatile organic compounds according to claim 4, wherein each of the adsorption-filtration layers comprises an activated carbon filter layer or a molecular sieve filter layer;
the activated carbon filter layer comprises at least one selected from a group consisting of granular activated carbon, honeycomb activated carbon, hollow columnar activated carbon and activated carbon fiber filter cotton;
the molecular sieve filter layer comprises at least one selected from another group consisting of a granular molecular sieve, a honeycomb molecular sieve and a hollow cylindrical molecular sieve.

6. The filter element for coupling adsorption and regeneration of volatile organic compounds according to claim 1, wherein the filter element further comprises a handle cover-plate and an end cover sealing-plate that are oppositely arranged,
the handle cover-plate is located at one end of the filter element body, the end cover sealing-plate is located at an other end of the filter element body, and the handle cover-plate and the end cover sealing-plate are separately connected to the filter element body;
one side of the end cover sealing-plate which is close to the filter element body is provided with an ultraviolet-lamp power supply socket.

7. A purification device, comprising a box body and filter elements, each of the filter elements comprising a filter element body, a photocatalytic mechanism and at least one adsorption-filtration body, wherein the at least one adsorption-filtration body is arranged in the filter element body and provided with a catalytic space, the photocatalytic mechanism is at least partially located in the catalytic space of the at least one adsorption-filtration body, the at least one adsorption-filtration body is configured to adsorb and filter volatile organic compounds, and the photocatalytic mechanism is configured to perform photocatalytic purification treatment on the volatile organic compounds in the at least one adsorption-filtration body;
wherein the box body comprises an air inlet, a filter cavity and an air outlet that are communicated with each other in sequence, and the filter elements for coupling adsorption and regeneration of volatile organic compounds are arranged in the filter cavity, so that a to-be-purified gas enters from the air inlet, flows through the filter elements for coupling adsorption and regeneration of volatile organic compounds and then is discharged from the air outlet;
the purification device further comprising at least one check valve, a constant temperature heating device and at least one regeneration circulating fan;
the at least one regeneration circulating fan and the at least one check valve are arranged in one-to-one correspondence, each of the at least one check valve and a corresponding one of the at least one regeneration circulating fan are mounted in a respective one of filter element mounting holes of the filter cavity, and the at least one check valve each is configured to limit a unidirectional pressure relief direction in the filter cavity; the constant temperature heating device is located between the at least one check valve and the at least one regeneration circulating fan; and the constant temperature heating device is configured to heat air and indirectly heat the at least one adsorption-filtration body by using the air after being heated, so as to enable thermal desorption of the volatile organic compounds that are adsorbed; and
wherein the photocatalytic mechanism comprises an ultraviolet lamp and a heating mechanism; and
wherein the at least one adsorption-filtration body comprise one adsorption-filtration body; the one adsorption-filtration body is of a hollow columnar structure, the ultraviolet lamp is located in the hollow columnar structure of the one adsorption-filtration body and at a center of the filter element body; the one adsorption-filtration body abuts against an inner side wall of the filter element body; and the heating mechanism is arranged between the one adsorption-filtration body and the filter element body and configured to heat the one adsorption-filtration body.

8. The purification device according to claim 7, wherein the filter cavity comprises a first cavity and a second cavity that are communicated with each other, an inlet of the first cavity is communicated with the air inlet, and an outlet of the second cavity is communicated with the air outlet;

the box body is internally provided with a plurality of filter element mounting holes corresponding to the first cavity; the filter elements for coupling adsorption and regeneration of volatile organic compounds are mounted in the filter element mounting holes in a one-to-one correspondence, such that a to-be-purified gas enters from the air inlet, passes through the plurality of filter elements for coupling adsorption and regeneration of volatile organic compounds, then flows through the second cavity and is discharged through the air outlet.

9. The purification device according to claim 8, wherein each of the filter element mounting holes is provided with a filter-element guide rail; and each of the filter elements for coupling adsorption and regeneration of volatile organic compounds is mounted in a corresponding one of the filter element mounting holes through the filter-element guide rail.

10. The purification device according to claim 7, wherein the filter cavity comprises a first filter cavity, a second filter cavity, and a gas flow cavity; and the first filter cavity and the second filter cavity are located on two sides of the gas flow cavity, and separately communicated with the gas flow cavity;

an inlet of the first filter cavity and an inlet of the second filter cavity are both communicated with the air inlet, an outlet of the first filter cavity and an outlet of the second filter cavity are both communicated with an inlet of the gas flow cavity, and an outlet of the gas flow cavity is communicated with the air outlet;

the first filter cavity and the second filter cavity each are internally provided with a plurality of filter element mounting holes, and the filter elements for coupling adsorption and regeneration of volatile organic compounds are mounted in the filter element mounting holes in a one-to-one correspondence, such that a to-be-purified gas enters from the air inlet, passes through the plurality of filter elements for coupling adsorption and regeneration of volatile organic compounds, then flows through the gas flow cavity and is discharged through the air outlet.

11. The purification device according to claim 7, further comprising a controller, a differential pressure sensor, a temperature sensor and an alarm device, wherein the differential pressure sensor, the temperature sensor and the alarm device are connected to the controller via electrical signals; the differential pressure sensor is arranged in the filter cavity, and the differential pressure sensor is located at an air outlet end of the filter elements for coupling adsorption and regeneration of volatile organic compounds, the differential pressure sensor is configured to detect a pressure drop difference signal in the filter cavity and output the pressure drop difference signal to the controller; and the temperature sensor is arranged at an air outlet end of the filter cavity, and configured to measure a temperature of an exhaust gas and transmit information of the temperature of the exhaust gas to the controller;

the controller is respectively connected to the at least one check valve, the at least one regeneration circulating fan and the alarm device via other electrical signals; and the controller is configured to respectively control the at least one check valve, the at least one regeneration circulating fan and the alarm device according to the pressure drop difference signal in the filter cavity and the information of the temperature of the exhaust gas.

12. The filter element for coupling adsorption and regeneration of volatile organic compounds according to claim 2, wherein the filter element body comprises a porous catalytic sleeve;

the porous catalytic sleeve is of a circular structure or a circular folded structure, and has a porosity not less than 30%.

13. The filter element for coupling adsorption and regeneration of volatile organic compounds according to claim 12, wherein each of the adsorption-filtration bodies comprises a first side mesh, adsorption-filtration layers and a second side mesh that are connected in sequence;

the adsorption-filtration layers are located between the first side mesh and the second side mesh, and the first side mesh abuts against the heating mechanism.

14. The filter element for coupling adsorption and regeneration of volatile organic compounds according to claim 2, wherein the filter element further comprises a handle cover-plate and an end cover sealing-plate that are oppositely arranged, the handle cover-plate is located at one end of the filter element body, the end cover sealing-plate is located at an other end of the filter element body, and the handle cover-plate and the end cover sealing-plate are separately connected to the filter element body;

one side of the end cover sealing-plate which is close to the filter element body is provided with a plurality of ultraviolet-lamp power supply sockets.

15. The purification device according to claim 7, wherein the photocatalytic mechanism comprises a plurality of ultraviolet lamps and the heating mechanism;

the at least one adsorption-filtration body comprises a plurality of adsorption-filtration bodies; another catalytic space between adjacent two of the adsorption-filtration bodies is provided with one of the plurality of ultraviolet lamps at a center of the filter element body; the adsorption-filtration bodies abut against an inner side wall of the filter element body, and the heating mechanism is arranged between the adsorption-filtration bodies and the filter element body, and configured to heat the adsorption-filtration bodies.

16. The purification device according to claim 15, wherein the filter element body comprises a porous catalytic sleeve;

the porous catalytic sleeve is of a circular structure or a circular folded structure, and has a porosity not less than 30%.

17. The purification device according to claim 16, wherein the one adsorption-filtration body comprises a first side mesh, adsorption-filtration layers and a second side mesh that are connected in sequence;

the adsorption-filtration layers are located between the first side mesh and the second side mesh, and the first side mesh abuts against the heating mechanism.

\* \* \* \* \*